United States Patent
Xie et al.

(10) Patent No.: US 9,338,741 B2
(45) Date of Patent: May 10, 2016

(54) SECURITY SYSTEM DEVICE POWER MANAGEMENT

(71) Applicant: MivaLife Mobile Technology, Inc., George Town (KY)

(72) Inventors: Qiang Xie, Wuhan (CN); Jingui Zhang, Wuhan (CN); Kuochun Lee, Fremont, CA (US)

(73) Assignee: MivaLife Mobile Technology, Inc., Grand Cayman (KY)

(*) Notice: Subject to any disclaimer, the term of this patent is extended or adjusted under 35 U.S.C. 154(b) by 127 days.

(21) Appl. No.: 14/076,961

(22) Filed: Nov. 11, 2013

(65) Prior Publication Data

US 2015/0131500 A1 May 14, 2015

(51) Int. Cl.
| | |
|---|---|
| *H04B 7/00* | (2006.01) |
| *H04W 52/02* | (2009.01) |
| *G08B 25/00* | (2006.01) |
| *G08B 25/10* | (2006.01) |
| G08B 13/196 | (2006.01) |
| G08B 29/18 | (2006.01) |

(52) U.S. Cl.
CPC ......... *H04W 52/0206* (2013.01); *G08B 25/007* (2013.01); *G08B 25/10* (2013.01); *G08B 13/19656* (2013.01); *G08B 29/181* (2013.01)

(58) Field of Classification Search
CPC .............. H04W 52/0203; H04W 52/0225; H04W 52/0235; H04W 52/0251
USPC .................. 370/310, 311, 349, 350
See application file for complete search history.

(56) References Cited

U.S. PATENT DOCUMENTS

| | | | |
|---|---|---|---|
| 8,050,206 B2* | 11/2011 | Siann et al. ................ | 370/310 |
| 8,134,942 B2* | 3/2012 | Messinger et al. .......... | 370/311 |
| 8,571,500 B2* | 10/2013 | Robson ................... | 455/150.1 |
| 8,873,444 B2* | 10/2014 | Tiberi et al. .............. | 370/311 |
| 8,907,807 B2* | 12/2014 | Huang et al. .............. | 340/693.2 |
| 2003/0151513 A1* | 8/2003 | Herrmann et al. ......... | 340/573.1 |
| 2005/0128295 A1* | 6/2005 | Addy ........................ | 348/153 |
| 2005/0275528 A1 | 12/2005 | Kates | |
| 2007/0046780 A1* | 3/2007 | Johnston .................... | 348/152 |
| 2013/0170417 A1* | 7/2013 | Thomas et al. ............. | 370/311 |
| 2014/0031988 A1* | 1/2014 | Reeder et al. .............. | 700/276 |
| 2014/0062669 A1* | 3/2014 | Mena et al. ................ | 340/10.5 |

FOREIGN PATENT DOCUMENTS

WO    WO 2007/064747    6/2007

OTHER PUBLICATIONS

Partial European Search Report received in European Patent Application No. 14180181.1, filed Aug. 7, 2014. 5 pages.
Supplemental European Search Report received in European Patent Application No. 14180181.1, filed Aug. 7, 2014. 5 pages.

(Continued)

*Primary Examiner* — Dmitry H Levitan
(74) *Attorney, Agent, or Firm* — Fish & Richardson P.C.

(57) ABSTRACT

Methods, systems, and apparatus are provided for power management. The methods include detecting a triggering event at a sensor device of a security system; activating a wireless transmitter/receiver from a low power mode; detecting a broadcast beacon frame from an access point device; transmitting a probe request frame that includes triggering event data; and returning the wireless transmitter/receiver to a low power mode.

10 Claims, 5 Drawing Sheets

(56) References Cited

OTHER PUBLICATIONS

EPO Communication pursuant to Article 94(3) received in European Patent Application No. 14180181.1, filed Aug. 7, 2014. 7 pages.

Taiwanese Office Action received in Taiwanese Patent Application 103126790, filed Aug. 5, 2014. 9 Pages.

* cited by examiner

SECURITY SYSTEM DEVICE POWER MANAGEMENT

BACKGROUND

This specification generally relates to power management.

Conventional security systems can include one or more security cameras and/or one or more sensors positioned at different points of a security system location, e.g., a home or office. Some conventional home security systems use a public switched telephone network (PSTN) to transmit alerts to an authorized call service provider using dual-tone multi frequency (DTMF) signaling. A live operator at the call service provider services incoming alarms, e.g., by calling the police.

In some security systems, the cameras, sensors, or other devices communicate with an access point using wireless signals. These devices can be line or battery powered. However, some conventional wireless communications incur large power consumption that can impair long term use of battery powered devices.

SUMMARY

In general, one innovative aspect of the subject matter described in this specification can be embodied in methods that include the actions of detecting a triggering event at a sensor device of a security system; activating a wireless transmitter/receiver from a low power mode; detecting a broadcast beacon frame from an access point device; transmitting a probe request frame that includes triggering event data; and returning the wireless transmitter/receiver to a low power mode.

The foregoing and other embodiments can each optionally include one or more of the following features, alone or in combination. The triggering event is in response to motion detection by a motion sensor. The triggering event is a displacement event detected by a window or door displacement sensor. Transmitting the probe request frame that includes the triggering event data includes embedding data associated with the detected triggering event in a field of the probe request frame along with an identifier of the sensor device. The access point device is associated with a security management device of the security system.

In general, one innovative aspect of the subject matter described in this specification can be embodied in methods that include the actions of receiving, at an actuator device of a security system, a radio frequency (RF) wake-up signal from a security management device of the security system; activating a wireless transmitter/receiver from a low power mode in response to the received RF wake-up signal; establishing communication with the security management device using the wireless transmitter/receiver; receiving actuation instructions from the security management device; and performing actuation of the actuation device.

The foregoing and other embodiments can each optionally include one or more of the following features, alone or in combination. The actuator device is a door actuator and performing actuation includes opening an associated door. The radio frequency wake-up signal is received at a low power radio frequency module. The method further includes returning the wireless transmitter/receiver to the low power mode after receiving the actuation instructions. Establishing communication with the security management device includes detecting a broadcast beacon frame and initiating communication with a probe request frame.

In general, one innovative aspect of the subject matter described in this specification can be embodied in security systems that include a sensor device and a security management device, wherein the sensor device is configured to perform operations including: detecting a triggering event at the sensor device; activating a wireless transmitter/receiver from a low power mode; detecting a broadcast beacon frame from the security management device; transmitting a probe request frame that includes triggering event data; and returning the wireless transmitter/receiver to a low power mode following transmission of the probe request frame.

In general, one innovative aspect of the subject matter described in this specification can be embodied in security systems that include an actuator device and a security management device, wherein the actuator device is configured to perform operations including: receiving, at the actuator device of a the security system, a radio frequency (RF) wake-up signal from the security management device; activating a wireless transmitter/receiver from a low power mode in response to the received RF wake-up signal; establishing communication with the security management device using the wireless transmitter/receiver; receiving actuation instructions from the security management device; and performing actuation of the actuation device.

Particular embodiments of the subject matter described in this specification can be implemented so as to realize one or more of the following advantages. Power consumption of battery operated wireless devices can be reduced. Wireless transmitter/receivers can be deactivated or otherwise placed in a low-power mode when not needed to reduce power consumption while still providing desired functionality. Additionally, a process for establishing communication between a wireless device and a management device can be modified to reduce the time in which a wireless transmitter/receiver is active, thereby conserving power usage. In particular, a wireless sensor can, upon being triggered, activate a wireless transmitter and initiate a wireless handshake process that also includes sensor trigger information. In some other implementations, a wireless actuator can have a wireless receiver inactive to conserve power while still being configured to receive a remote activation signal, for example, to a radio frequency (RF) module.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
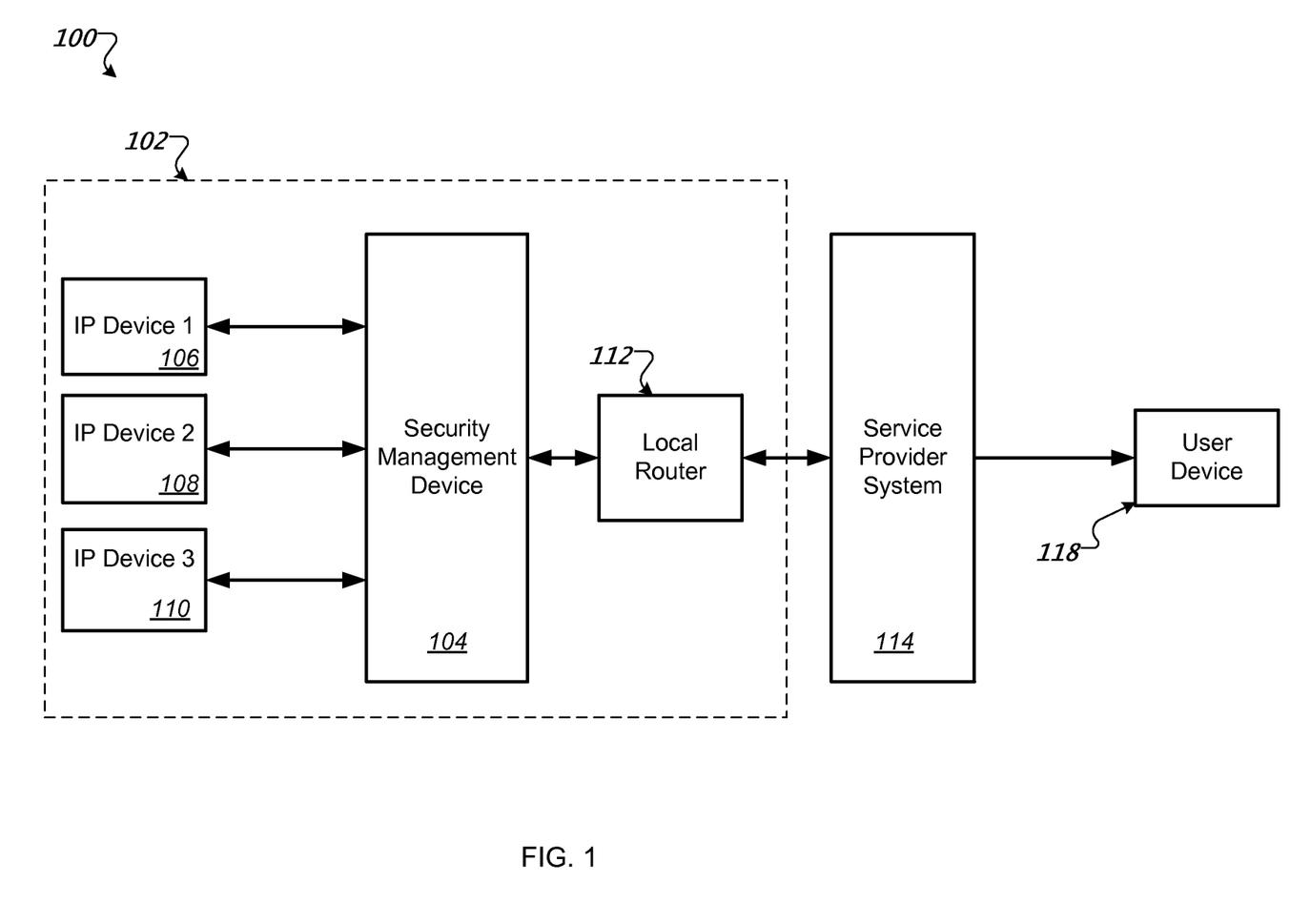
FIG. 1 is a block diagram of an example system.

FIG. 1 is a block diagram of an example system 100. The system 100 includes a local security system 102 that is communicatively coupled to a service provider system 114, e.g., through a network (not illustrated).

The local security system 102 includes a security management device 104 and wireless enabled devices 106, 108, and 110. In some implementations, the wireless enabled devices 106, 108, and 110 are communicatively coupled to the security management device 104 through a secure wireless network.

The wireless enabled devices 106, 108, and 110 can include different Internet Protocol (IP) devices such as IP cameras as well as wireless sensors and other devices. For example, in a typical home security system, several strategically positioned cameras and sensors may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls. Additionally, the wireless enabled devices can include actuator devices. The actuator devices can include for example a door actuator that allows for remote locking and unlocking of an associated door, window, or other latched structure.

Video data captured by an IP camera (e.g., video, a video clip, or one or more still images generated from video), can be wirelessly transmitted to the security management device 104 for transmission to the service provider system 114. The security management device 104 can also include an RF transmitter/receiver configured to receive alerts or other communications from the respective sensors, cameras, and other devices. The RF transmitter/receiver can use any suitable RF wireless protocol, in particular those used in home security and automation including, for example, 433 MHz, 426 MHz, 868 MHz, Zwave, Zigbee, WiFi, etc.

The security management device 104 can be an access point device. The security management device 104 can be used to manage the wireless enabled devices 106, 108 and 110, for example, to establish the secure wireless network and to communicate with the service provider system 114. For example, the security management device 104 can send event notifications, e.g., in response to a triggered sensor, to the service provider system 114 which provides the event notifications to one or more users of the local security system 102, e.g., to user device 118. Similarly, the security management device 104 can receive commands from the service provider system 114, e.g., to provide video data to a particular authorized user of the local security system 102 in response to a request or to activate a particular device of the local security system 102 such as an actuator device, as will be described in greater detail below.

The security management device 104 is communicatively coupled to the service provider system 114, e.g., using a modem or directly to the Internet through an ISP, through a local router 112. In some implementations, the local router 112 can be coupled to one or more modes of communication. For example, a broadband connection mode such as cable or Ethernet, a PSTN telephone connection mode, or a cellular connection mode. In some alternative implementations, the security management device 104 includes a router such that the separate local router 112 is not included in the local security system 102.

The security management device 104 can also act as a gatekeeper that provides a single avenue for communication with the service provider system 114. In particular, instead of allowing the wireless enabled devices to communicate directly with the service provider system 114, e.g., using a 3G dongle, only local communications within the security system, e.g., to the security management device 104, are permitted. This reduces the number of connections between various security systems and the service provider system 114. The security management device 104 can periodically communicate with the wireless enabled devices 106, 108, and 110, for example, to confirm active status. If there is a problem one of the wireless enabled devices, the security management device 104 can notify the service provider system 114 which may in turn notify one or more user devices associated with the security system, e.g., user device 118.

The service provider system 114 provides management and communication functions for the system 100. In particular, while only one local security system 102 is shown, the service provider system 114 can be used to manage multiple different local security systems associated with corresponding users. The service provider system 114 can be one or more servers or a cloud based management system. The service provider system 114 can provide authentication and registration functions for establishing a secure wireless network at the local security system 102 as well as for authenticating user control commands and requests. Furthermore the service provider system 114 can manage communication between the security management device 104 and one or more user devices 118 associated with the local security system 102.

The user device 118 represents various device types that can be used by one or more users to receive security data, e.g., alerts or video streams, and provide control instructions for the local security system 102. For example, the user devices 118 can be one of various types of smartphones that includes a security management application or a web browser for accessing a security management website.

When the user device 118 attempts to interact with the service provider system 114, its authority may be confirmed by the service provider system 114. For example, the user device 118 can provide information that uniquely identifies the requesting device, e.g., an Internet Protocol (IP) address, a product serial number, or a cell phone number. Alternatively, the user may provide a user name and password which are validated to determine authority to interact with the service provider system 114 and to access data associated with the local security system 102. To facilitate such authorization procedures, the service provider system 114 can store, or have ready access to, authorization information for each secure wireless network of users who subscribe to the service. The user device 118 can be used to receive information from the local security system 114, e.g., alarm information, as well as used to control functions of the security system, e.g., to request video data from an IP camera or to activate an actuator device (e.g., a door actuator) of the local security system 102 (e.g., as wireless enabled device 106).

Figure 2:
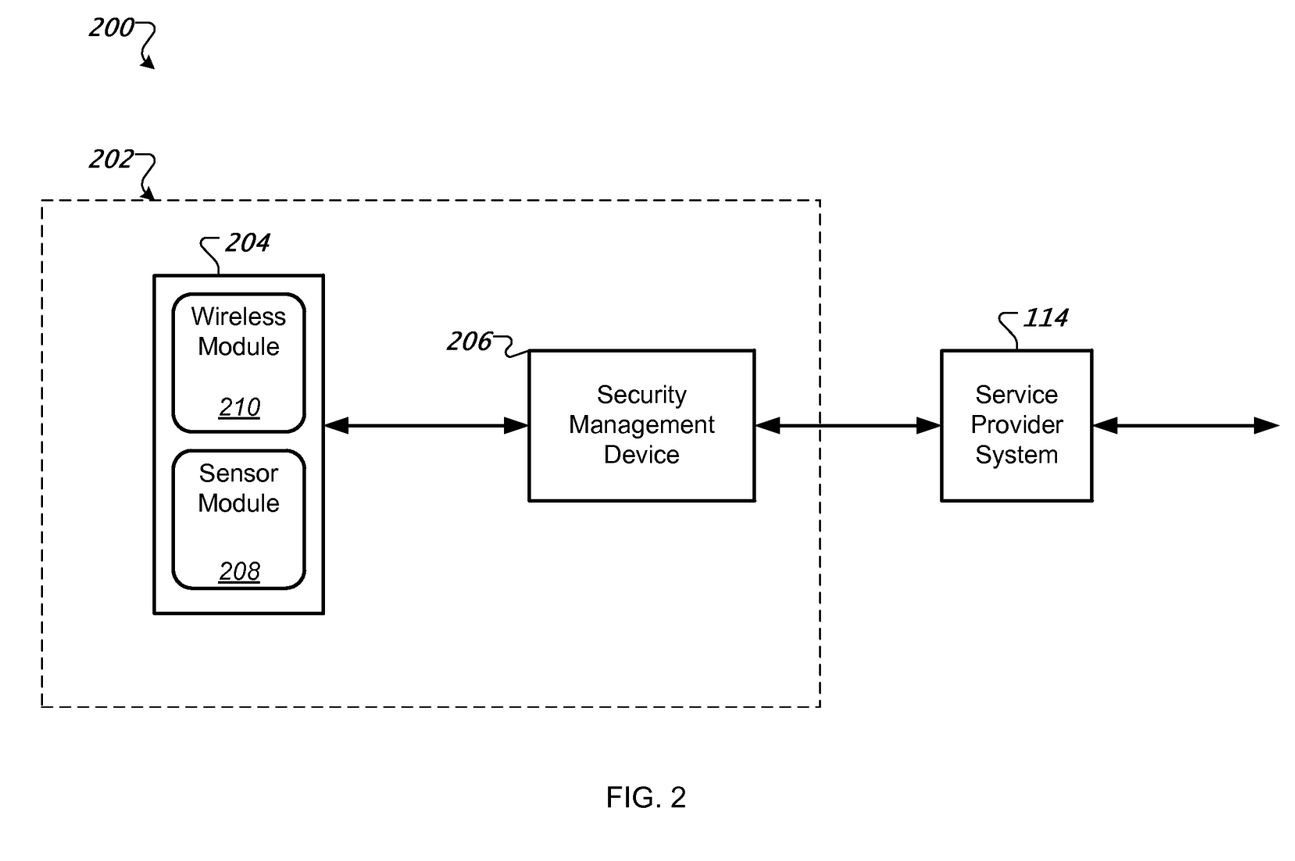
FIG. 2 is a block diagram of an example system including a local security system having a wireless sensor device.

FIG. 2 is a block diagram of an example system 200 including a local security system 202 having a wireless sensor device 204.

The system 200 includes the local security system 202, which can communicate with the service provider system 114 as described with respect to FIG. 1. The service provider system 114 can be in communication with one or more user devices as well as other local security systems associated with other users.

The local security system 202 includes a security management device 206 and the wireless sensor device 204. The local security system 202 can include other wireless enabled devices, either radio frequency or WiFi, but are not shown for clarity.

The security management device 206 can function similar to the security management device 104 of FIG. 1. In particular, the security management device 206 can be an access point device used to establish a wireless network among security devices of the local security system and to manage the individual devices such as wireless sensor device 204. The security management device 206 can send event notifications, e.g., in response to a triggered sensor, to the service provider system 114. The service provider system 114 can then provide the event notifications to one or more users of the local security system 202. Similarly, the security management device 206 can receive commands from the service provider system 114, in response to user commands or requests. For example, the user request can be for video data captured by a video camera device or a request to open a door using an actuator device of the security system 202.

As a wireless access point device, the security management device 206 can periodically transmit a beacon frame that announces the presence of the wireless network and includes information about the network. The beacon frame can be transmitted on an interval, for example, of 100 milliseconds. In some implementations, the content of the beacon frame is broadcast according to the 802.11 wireless specification. When the wireless sensor 204 within range of the beacon, they can use it to initiate communication with the security management device 206.

The wireless sensor 204 includes a sensor module 208 and a wireless module 210. The sensor module 208 provides the sensor functionality of the sensor device 204 while the wireless module 210 allows the wireless sensor 204 to communicate with the security management device 206.

For example, the wireless sensor 204 can be a motion sensor or a door/window sensor. Particular events detected by the sensor module 208 can trigger the wireless sensor 204, e.g., specific movement or displacement of a door/window associated with the wireless sensor 204.

The wireless module 210 includes a WiFi transmitter/receiver. The WiFi transmitter/receiver can be placed in a low power or standby mode, e.g., by the wireless sensor 204. For example, the low power or standby mode can deactivate the transmitter/receiver to conserve electricity, particularly when the wireless sensor 204 is battery powered.

The wireless module 210 can activate the WiFi transmitter/receiver, for example, in response to the sensor module 208 being triggered. Once the WiFi transmitter/receiver is activated, the wireless module 210 can initiate communication with the security management device 206 and pass on information about the triggering event.

In some implementations, the wireless sensor 204 uses a modified form of the 802.11 wireless protocols for establishing communication with the security management device 206 to send the information about the triggering event. In particular, once the WiFi transmitter/receiver is activated, it can listen for the beacon frame from the security management device 206. Once the periodic beacon frame is received, the wireless sensor 204 can use the WiFi transmitter/receiver to transmit a probe request frame having a field that has been configured to contain the triggering event information. Specifically, the field of the probe request frame can includes customized information including an SSID identifying the sensor device and the triggering event information.

The wireless sensor 204 does not need to complete the full handshake process for establishing communication with the security management device 206. Once the probe request frame is sent, the wireless sensor 204 can return to a low power mode in which the WiFi transmitter/receiver is powered down. This eliminates a number of additional steps that typically occur in an IEEE 802.11 protocol handshake between a wireless device and an access point, for example, probe response, authentication requests, and association request and responses. As a result, battery power of the wireless sensor 204 can be conserved.

The security management device 206 extracts the triggering event information and optionally verifies the information. After which, the security management device 206 takes an appropriate action in response to the triggered event. This action can be specified by one or more rules and can include alerting a user through the service provider system 114 as well as locally triggering an alarm.

Figure 3:
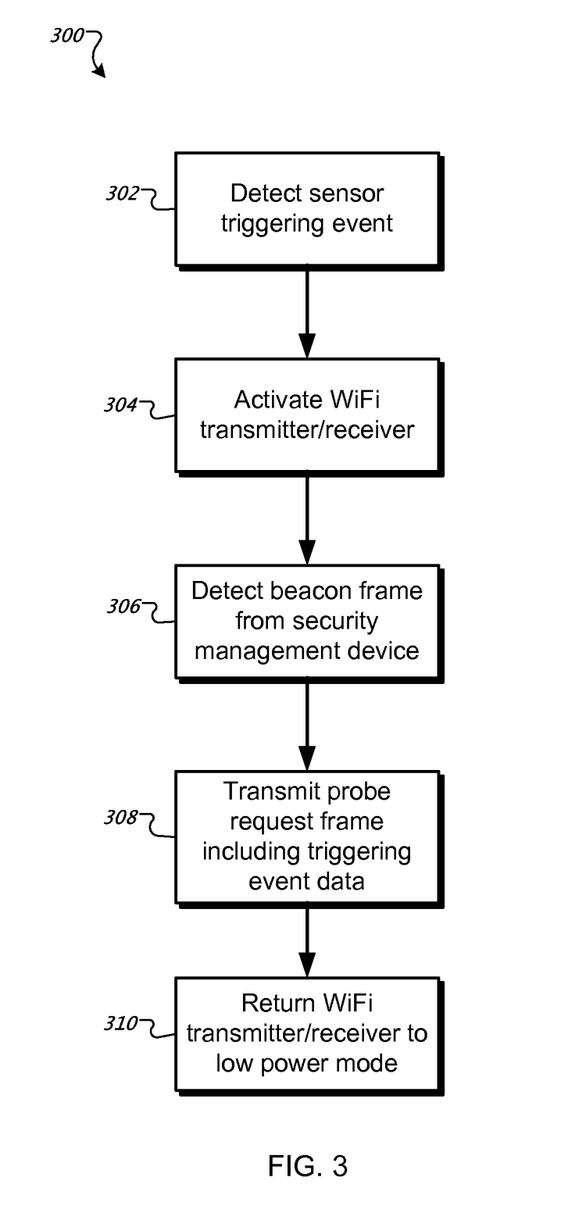
FIG. 3 is a flow diagram of an example method for alerting a security management device in response to a triggered sensor.

FIG. 3 is a flow diagram of an example method 300 for alerting a security management device in response to a triggered sensor. For convenience, the method 300 will be described with respect to a device that performs the method 300, in particular a wireless sensor device, e.g., wireless sensor 204 of FIG. 2.

The wireless sensor detects 302 a triggering event. For example, motion that triggers a motion sensor module or displacement of a window or door that triggers a displacement sensor module.

The wireless sensor activates 304 a WiFi transmitter/receiver of the wireless sensor. For example, the WiFi transmitter/receiver can be in a standby or low power mode that conserves power by deactivating the WiFi transmitter/receiver.

The wireless sensor detects 306 a beacon frame transmitted by a security management device, e.g., security management device 206. In particular, the wireless sensor listens for a periodically transmitted beacon frame.

In response to the detected beacon frame, the wireless sensor transmits 308 a probe request frame including triggering event information. When generating the probe request frame, the wireless sensor embeds data for the triggering event in a field of the probe request frame. This data can include, for example, a code for a type of event, an identifier for the wireless sensor, a timestamp of the event, etc. After transmitting the probe request frame, the wireless sensor returns 310 the WiFi transmitter/receiver to the standby or low power mode.

Figure 4:
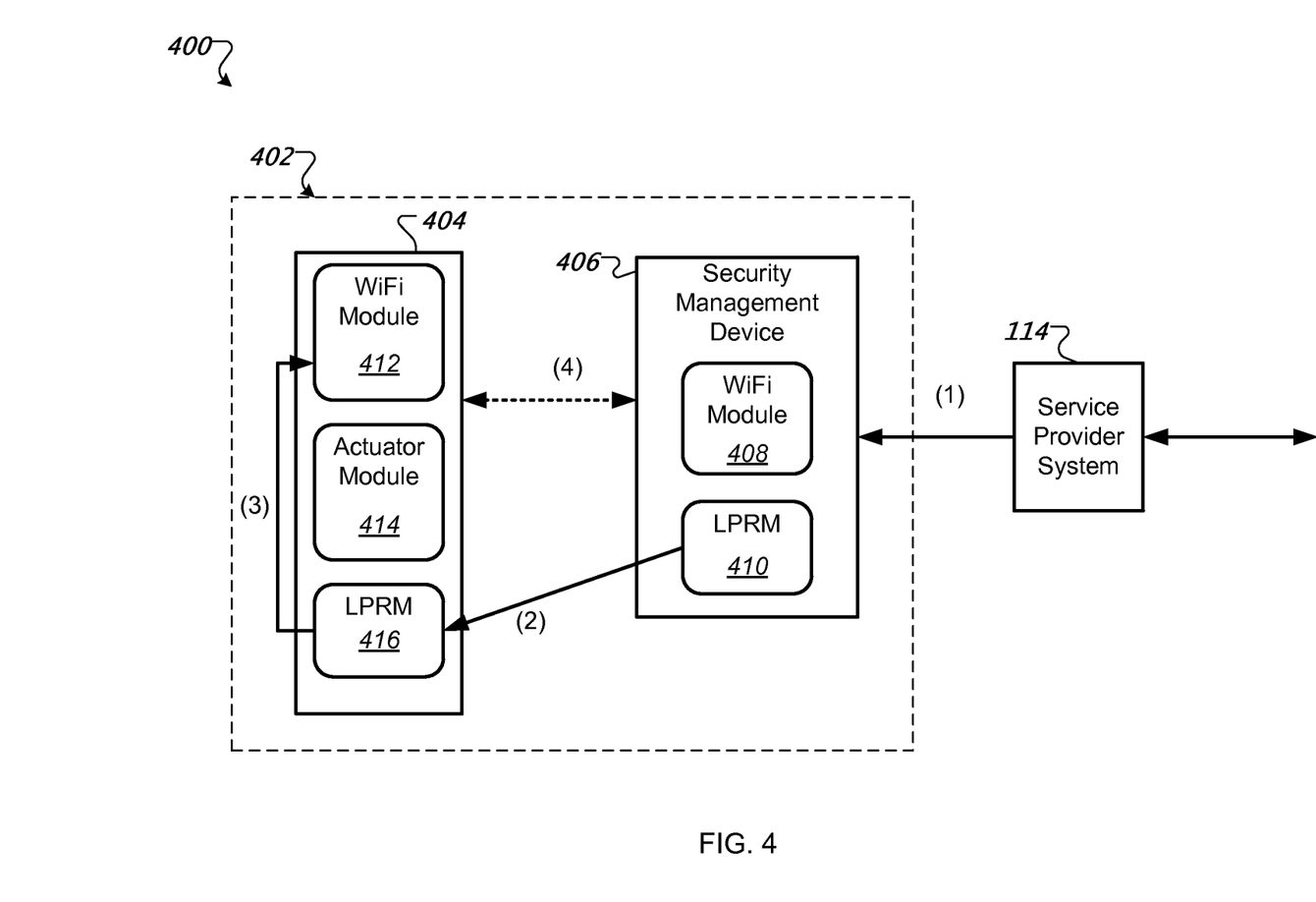
FIG. 4 is a block diagram of an example system including a local security system having a wireless actuator.

FIG. 4 is a block diagram of an example system 400 including a local security system 402 having a wireless actuator device 404.

The system 400 includes the local security system 402, which can communicate with the service provider system 114 as described with respect to FIG. 1. The service provider system 114 can be in communication with one or more user devices as well as other local security systems associated with other users.

The local security system 402 includes a security management device 406 and the wireless actuator device 404. The local security system 402 can include other wireless enabled devices, either radio frequency or WiFi, but are not shown for clarity.

The security management device 406 can function similar to the security management device 104 of FIG. 1. In particular, the security management device 406 can be an access point device used to establish a wireless network among security devices of the local security system and to manage the individual devices such as wireless actuator device 404. The security management device 406 can send event notifications, e.g., in response to a triggered sensor, to the service provider system 114. The service provider system 114 then provides the event notifications to one or more users of the local security system 402. Similarly, the security management device 406 can receive commands from the service provider system 114, in response to user commands or requests, e.g., a user request to open a door associated with the wireless actuator device 404.

In the example system of FIG. 4, the security management device 406 includes both a WiFi module 408 and a low power radio frequency module (LPRM) 410. The WiFi 408 includes a WiFi transmitter/receiver configured to send and receive wireless communications. For example, the wireless module 408 can be used to periodically broadcast a beacon frame to establish communication with one or more wireless devices within range of the security management device 406, e.g., when setting up a local security system of wireless enabled devices, e.g., as described above. The wireless module 408 can also communicate information to one or more wireless devices in range as well as receive information from one or more wireless devices. The received information can include, for example, data describing a detected triggering event as well as images or video captured by a wireless camera.

The LPRM 410 includes a radio frequency transmitter and optionally a radio frequency receiver. The LPRM 410 is configured to transmit a radio frequency signal to one or more devices within range. For example, the security system can include one or more sensor that uses radio frequency communication instead of WiFi communication. The LPRM 410 can also be used to send communications to a wireless device, e.g., the wireless actuator device 404, when a corresponding WiFi module of the wireless actuator device 404 is powered down.

The wireless actuator device 404 includes a WiFi module 412, an actuator module 414, and an LPRM 416.

The WiFi module 412 includes a WiFi transmitter/receiver. The WiFi transmitter/receiver can be placed in a low power or standby mode. For example, the low power or standby mode can deactivate the transmitter/receiver to conserve electricity, particularly when the wireless actuator device 404 is battery powered.

The actuator module 414 provides actuation functions for the particular wireless actuator device 404. For example, the wireless actuator device 404 can be a door actuator device that can be used to remotely open a door in response to a received command. When the command is received, the actuator model 414 releases the door latch opening the door.

The LPRM 416 is similar to the LPRM 410 of the security management device 406. In particular, the LPRM 416 can receive a radio frequency signal when the WiFi module's transmitter/receiver is in a low power or standby mode.

When the security management device 408 receive a command (1) for the wireless actuator device 404 from the service provider system 114, the security management device 406 uses the LPRM 410 to wake up (2) the WiFi module 412 of the wireless actuator device 404. In response to the signal received by the LPRM 416 of the wireless actuator device 404, the WiFi module 412 is activated (3). Once activated, the security management device 406 can transmit the actuation command to the wireless actuator device 404 (4), which can then perform the actuation, e.g., to open a door.

Figure 5:
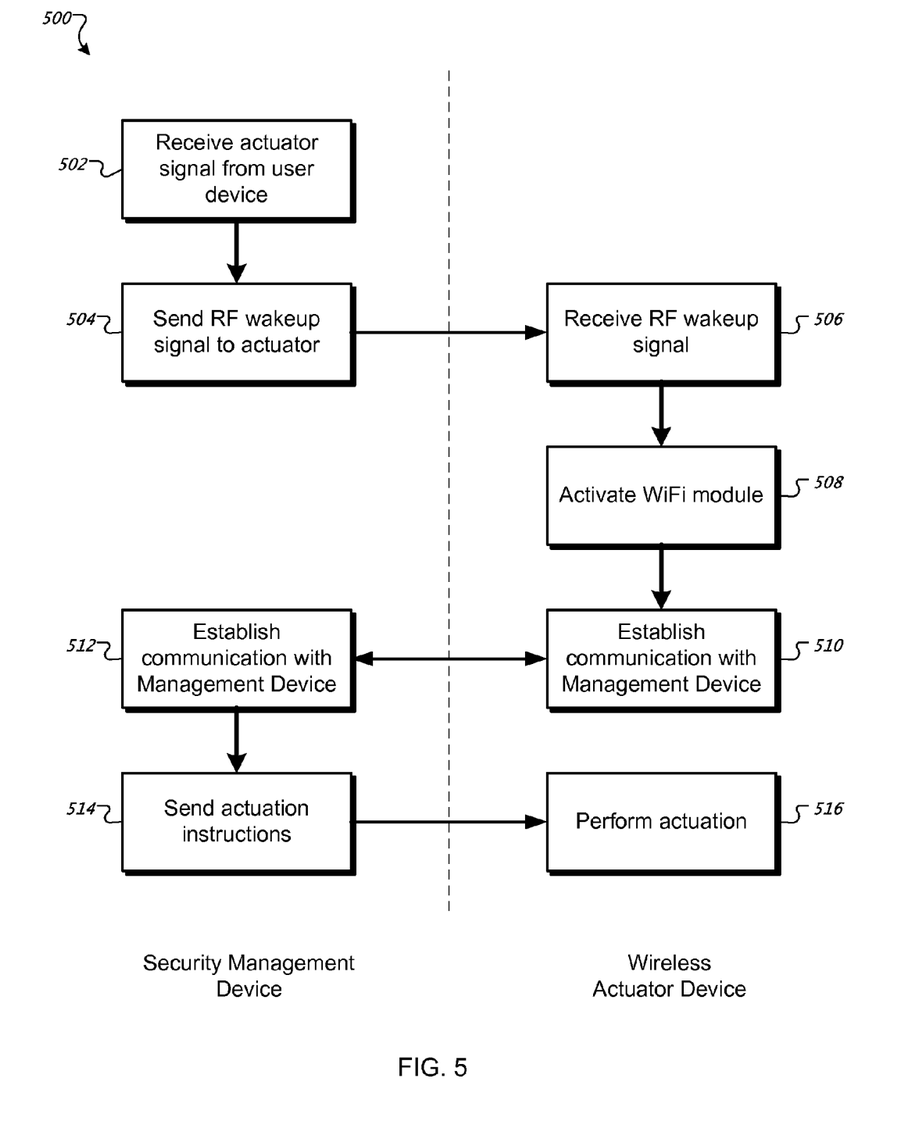
FIG. 5 is a swim lane diagram of example communications method.

FIG. 5 is a swim lane diagram of example communications method 500. For convenience, the method 500 will be described with respect to devices that perform the method 500, in particular a wireless actuator device, e.g., wireless sensor 404 of FIG. 4, and a security management device, e.g., security management device 406 of FIG. 4.

The security management device receives (502) an actuator signal from a user device by way of a service provider system. For example, the user device can be a mobile smartphone with a security management application installed. Using the security management application, a user can sent a command to actuate a particular actuator device. For example, the command can be to open a front door of the user's house to let someone in, e.g., a family member who forgot their door key. The user device transmits the command to the service provider system which then sends the command to the appropriate security management device of the security system having the actuator device.

The security management device sends (504) a radio frequency wake-up signal to the wireless actuator device. The radio frequency wake-up signal can be sent using a low power radio frequency module (LPRM), e.g., LPRM 410 of FIG. 4.

The wireless actuator device receives (506) the radio frequency wake-up signal from the security management device. In response to the received wake-up signal, the wireless actuator device activates (508) a WiFi module of the wireless actuator device. Using the activated WiFi module, the wireless actuator device establishes communication (510/512) with the security management device.

Once communication is established, the security management device transmits (514) the received user actuation instructions to the wireless actuator device. The wireless actuation device performs actuation (516) in response to the received instruction.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at an actuator device of a security system, a radio frequency (RF) wake-up signal from a security management device of the security system, wherein the RF wake-up signal is received at a radio frequency module of the actuator device;
   activating a wireless transmitter/receiver from a low power mode in response to the received RF wake-up signal, wherein the wireless transmitter/receiver is distinct from the radio frequency module;
   establishing communication with the security management device using the wireless transmitter/receiver;
   receiving actuation instructions from the security management device; and
   performing actuation of the actuation device.

2. The method of claim 1, wherein the actuator device is a door actuator and performing actuation includes opening an associated door.

3. The method of claim 1, wherein the radio frequency wake-up signal is an RF signal and wherein the wireless transmitter/receiver transmits and received data using one or more 802.11 wireless protocols.

4. The method of claim 1, further comprising returning the wireless transmitter/receiver to the low power mode after receiving the actuation instructions.

5. The method of claim 1, wherein establishing communication with the security management device includes using a modified form of 802.11 wireless protocols to initiate communication with the security management device.

6. A security system comprising:
   an actuator device and a security management device, wherein the actuator device is configured to perform operations including:
      receiving, at the actuator device of a the security system, a radio frequency (RF) wake-up signal from the security management device, wherein the RF wake-up signal is received at a radio frequency module of the actuator device;
      activating a wireless transmitter/receiver from a low power mode in response to the received RF wake-up signal, wherein the wireless transmitter/receiver is distinct from the radio frequency module;
      establishing communication with the security management device using the wireless transmitter/receiver;
      receiving actuation instructions from the security management device; and
      performing actuation of the actuation device.

7. The system of claim 6, wherein the actuator device is a door actuator and performing actuation includes opening a corresponding door.

8. The system of claim 6, wherein the radio frequency wake-up signal is received at a radio frequency module of the actuator device configured to transmit and receive radio frequency signals, wherein the radio frequency module is distinct from the wireless transmitter/receiver.

9. The system of claim 6, further comprising returning the wireless transmitter/receiver to the low power mode after receiving the actuation instructions.

10. The system of claim 6, wherein establishing communication with the security management device includes using a modified form of 802.11 wireless protocols to initiate communication with the security management device.

* * * * *